(12) United States Patent
Fujiwara (10) Patent No.: US 6,345,708 B1
(45) Date of Patent: Feb. 12, 2002

(54) BRAKE SHOE ANCHOR DEVICE FOR AN INTERNAL DRUM BRAKE DEVICE

(75) Inventor: Yoichi Fujiwara, Nagoya (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/572,085

(22) Filed: May 17, 2000

(30) Foreign Application Priority Data

May 18, 1999 (JP) ............................................. 11-137383

(51) Int. Cl.[7] ............................................. F16D 51/00
(52) U.S. Cl. ..................................................... 188/341
(58) Field of Search ................................. 188/341, 327, 188/328, 329, 78, 330, 331, 32, 325, 106 A, 335

(56) References Cited

U.S. PATENT DOCUMENTS

| | | | | |
|---|---|---|---|---|
| 3,283,858 A | * | 11/1966 | Mossey et al. | 188/341 |
| 4,249,646 A | * | 2/1981 | Roberts | 188/328 |
| 4,936,426 A | * | 6/1990 | Chatman et al. | 188/341 X |
| 5,062,506 A | * | 11/1991 | White | 188/329 |
| 5,099,967 A | * | 3/1992 | Lang | 188/328 |
| 6,131,708 A | * | 10/2000 | Fujiwara | 188/328 X |

FOREIGN PATENT DOCUMENTS

JP 54124162 * 9/1979

* cited by examiner

Primary Examiner—Robert J. Oberleitner
Assistant Examiner—Melanie Torres
(74) Attorney, Agent, or Firm—Liniak, Berenato, Longacre & White (57) ABSTRACT

It is one object of this invention to eliminate a driver's impression of delay in braking effectiveness at an initial stage of a braking operation and the phenomenon of over-braking with an internal drum brake device. For this purpose rigid anchor members (61b, 61b) and deformable anchor members (64, 64) respectively providing supporting points for the brake shoes are located at diametrically different positions from a brake center. The brake shoes (20, 30) are supported by the deformable anchor members (64, 64) until a braking force reaches a predetermined value but are supported by the rigid anchor members (61b, 61b) when braking forces exceeds the predetermined value.

19 Claims, 9 Drawing Sheets

BRAKE SHOE ANCHOR DEVICE FOR AN INTERNAL DRUM BRAKE DEVICE

BACKGROUND OF THE INVENTION

This invention relates to a brake shoe anchor device applicable to an internal drum brake device, particularly to a leading-trailing (LT) type, a two-leading (2L) type, or a single shoe type internal drum brake device.

Figure 8:
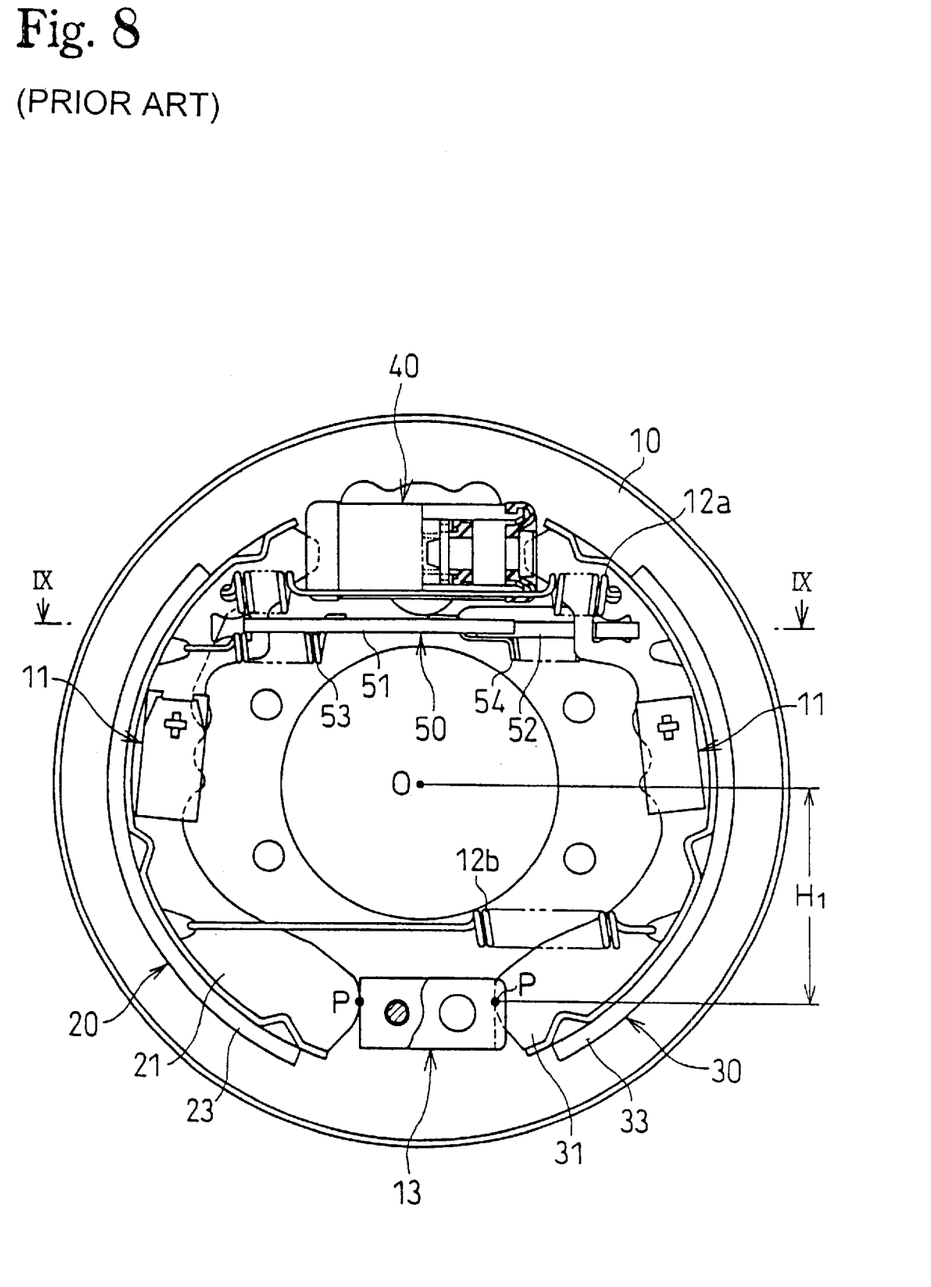
FIG. 8 is a plan view of a conventional LT type drum brake device.
Figure 9:
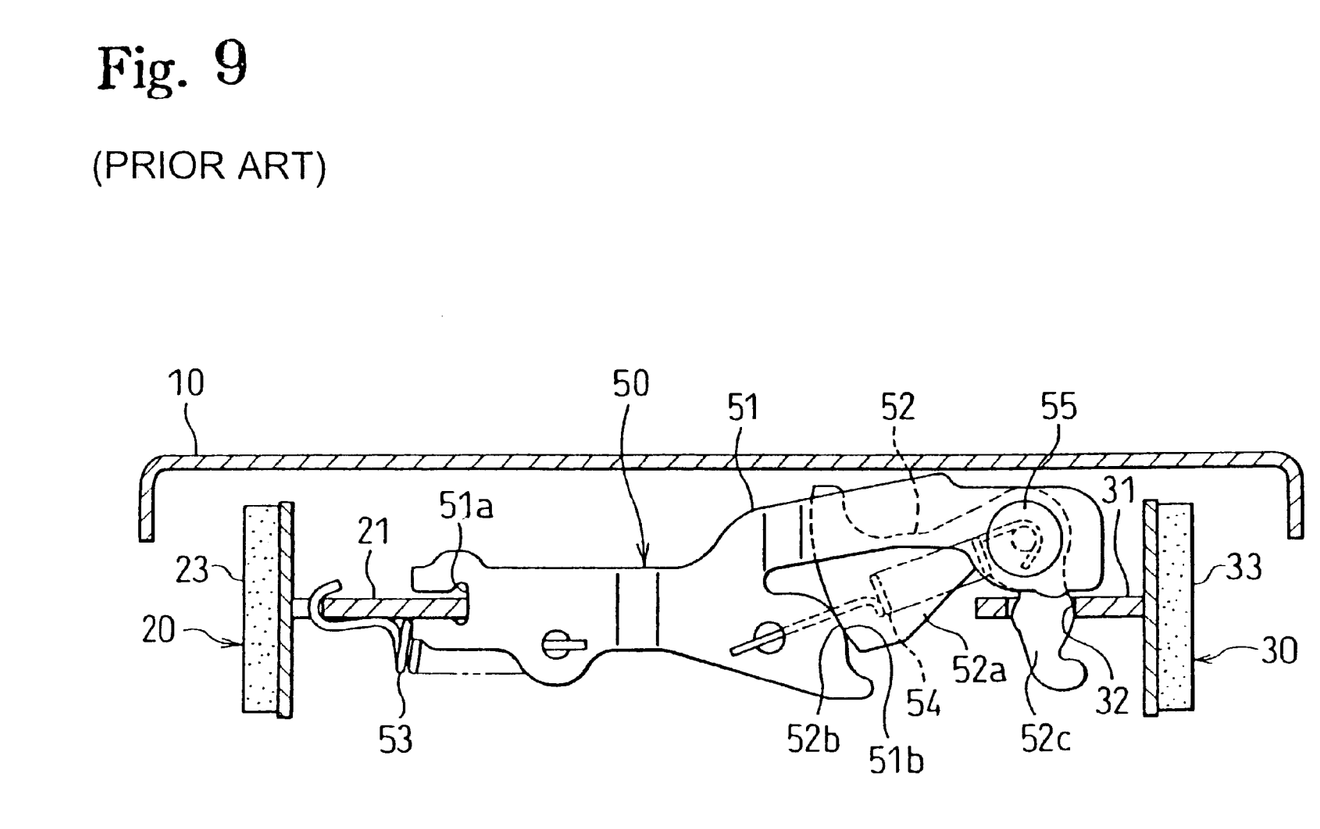
FIG. 9 is a cross-section view of FIG. 8 taken along the line IX—IX.

A conventional LT type drum brake device as shown in FIGS. 8 and 9 has a pair of brake shoes 20, 30 mounted on a back plate 10 and elastically retained by shoe holding mechanisms 11, 11.

In FIG. 8, the upper adjacent ends of the brake shoes 20, 30 respectively abut against a hydraulic cylinder 40 while the lower adjacent ends of the brake shoes 20, 30 abut against an anchor device 13, Further, a shoe return spring 12*a* extends between the upper inner sides of the brake shoes 20, 30 while a shoe return spring 12*b* extends between the lower inner sides of the brake shoes 20, 30.

Upon pressurizing the hydraulic cylinder 40 to push the upper adjacent ends of the brake shoes 20, 30 outwardly, the brake shoes 20, 30 spread open with points of abutment P, P on the anchor device 13 as the fulcrum. Then, linings 23, 33 of the brake shoes 20, 30 frictionally contact with an inner circumferential surface of a brake drum (not shown in the figures), thereby generating a braking force.

The braking force generated by the conventional LT type drum brake device depends on a brake drum inner radius, on an activating force applied to the brake shoes by the pressurized hydraulic cylinder 40, and on a brake factor. In case of the drum brake device shown in FIG. 8, the brake factor is known as a non-dimensional number which varies in accordance with a distance H1 from a horizontal line passing through a brake center O between the brake shoes 20, 30 to the supporting point P of the respective brake shoes 20, 30 on the anchor device 13 as shown in FIG. 8.

Adjacent to the hydraulic cylinder 40, a strut 50 with an automatic shoe clearance adjustment mechanism extends between the brake shoes 20 and 30. The left end of the strut 50 engages a shoe web 21 of the brake shoe 20, and the right end of the strut 50 engages a shoe web 31 of the brake shoe 30.

The structure of the strut 50 is briefly explained with reference to FIG. 9. The strut 50 is a one-shot automatic shoe clearance adjustment device which comprises an adjustment plate 51, a bell crank lever 52, a pin 55 and two springs 53, 54. The adjustment plate 51 has a notched groove 51*a* at the left side, and an inner edge of the shoe web 21 abuts against the bottom of the notched groove 51*a*.

Small teeth 51*b* are formed on an intermediate portion of the adjustment plate 51. The bell crank lever 52 is rotatably pivotally supported relative to the adjustment plate 51 by the pin 55 in the intermediate portion thereof and longitudinally movable along the surface of the adjustment plate 51. Small teeth 52*b* formed on an outer edge of a fan-shaped arm 52*a* of the bell crank lever 52 engage the small teeth 51*b* formed on the adjustment plate 51.

In addition, another arm 52*c* of the bell crank lever 52 with a cam surface is freely fit into a rectangular hole 32 formed on the shoe web 31 with a gap at the left side of the rectangular hole 32.

A first spring 53 extends between the shoe web 21 and the adjustment plate 51, and a second spring 54 extends between the adjustment plate 51 and the pin 55. The first and the second springs 53, 54 are so designed that a mounting load of the first spring 53 is higher than that of the second spring 54.

During braking, the adjustment plate 51 and the bell crank lever 52 move to the left together with the brake shoe 20 due to the spring force of the springs 53, 54. At this time, as is well-known in the field, if an amount of the wear of the linings 23, 33 exceeds an amount of the gap between the other arm 52*c* and the rectangular hole 32 plus a height of the engaged small teeth 51*b*, 52*b*, the bell crank lever 52 rotates counterclockwise, as shown in FIG. 9, for one pitch of the teeth to automatically adjust the clearance between the brake drum and the linings 23, 33, thereby maintaining the clearance to be always constant.

The above-described conventional drum brake device has the following points to be improved:

<A> During braking, a braking force actually acts at the time when the brake shoes 20, 30 frictionally contact with the inner circumferential surface of the brake drum. The time from the beginning of the brake shoe opening to the contact of the linings thereof with the brake drum is said to be the "delay".

Furthermore, since the braking force increases in relation to the pressure supplied to the hydraulic cylinder 40, in case of a gentle incline of the braking force increase, the response time before the driver actually feels a braking action or deceleration is even longer, thus giving the vehicle driver an impression of an even longer delay in braking effectiveness and thus an insecure feeling.

<B> Depending upon the materials constituting the linings 23, 33, wetness on the frictional surfaces of the linings 23, 33 and the brake drum causes an overbraking effect compared to the braking effect under a normal condition. This may also make a vehicle stop with a jerk or a series of jerks, which may lead to a dangerous situation by making a driver to hit his/her face on the steering wheel or by moving freight or loose items inside the vehicle.

OBJECTS AND SUMMARY OF THE INVENTION

The object of this invention is to provide a brake shoe anchor device for an internal drum brake device which resolves the problems mentioned above. More specifically, this invention aims at providing a brake shoe anchor device suitable to be employed in a drum brake device which eliminates the problem of the delay in the braking effectiveness or over-braking and which gives the driver a more secure feeling.

According to the invention, there is provided a brake shoe anchor device for an internal drum brake device as defined in claim 1. Preferred embodiments of the invention are defined in the sub-claims.

A first aspect of this invention is to provide a brake shoe anchor device for supporting an end of a brake shoe in an internal drum brake device, comprising two anchor members located at radial different positions with respect to a center of the brake device, one is a rigid anchor member having a rigid anchor surface for rigidly supporting the end of the brake shoe and the other is a deformable/resilient anchor member having a deformable anchor surface for resiliently supporting the end of the brake shoe, wherein the two anchor members are arranged such that the brake shoe is supported by the deformable anchor member before a braking force reaches a predetermined value, and such that the brake shoe is supported by the rigid anchor member when the braking force exceeds the predetermined value.

A second aspect of this invention is to provide a brake shoe anchor device as above wherein the deformable anchor member is positioned radially closer to a brake center than the rigid anchor member.

A third aspect of this invention is to provide a brake shoe anchor device as above wherein the deformable anchor member is positioned radially farther from a brake center than the rigid anchor member.

A fourth aspect of this invention is to provide a brake shoe anchor device as above wherein the deformable anchor member is comprised of an elastic material.

A fifth aspect of this invention is to provide a brake shoe anchor device as above wherein said deformable anchor member comprises a coil spring.

BRIEF DESCRIPTION OF DRAWINGS

The above and other objects and the attendant advantages of the present invention will become readily apparent by reference to the following detailed description when considered in conjunction with the accompanying drawings wherein.

Embodiment 1 of this Invention

DETAILED DESCRIPTION OF PREFERRED EMBODIMENTS

Embodiment 1 of this invention is explained with reference to FIGS. 1–5. Except for a brake shoe anchor device 60, this invention employs the same or a similar fundamental structure used in the above-described conventional drum brake device. Therefore, the same reference numbers as labeled above are used for the same or similar parts, and the explanation of the same is omitted.

<A> Anchor Device

Figure 1:
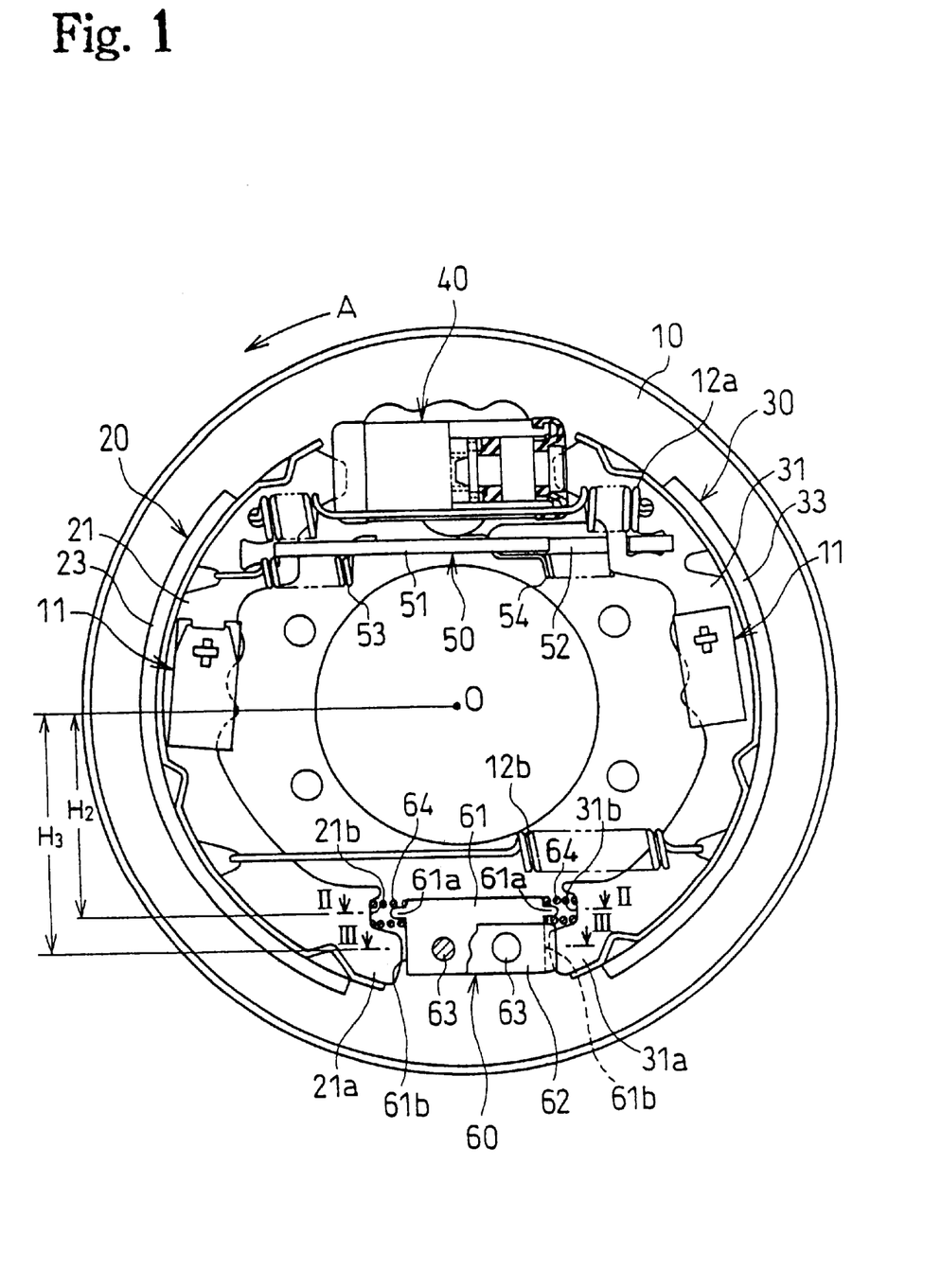
FIG. 1 is a plan view of a LT type drum brake device equipped with a brake shoe anchor device in accordance with Embodiment 1 of this invention.
Figure 2:
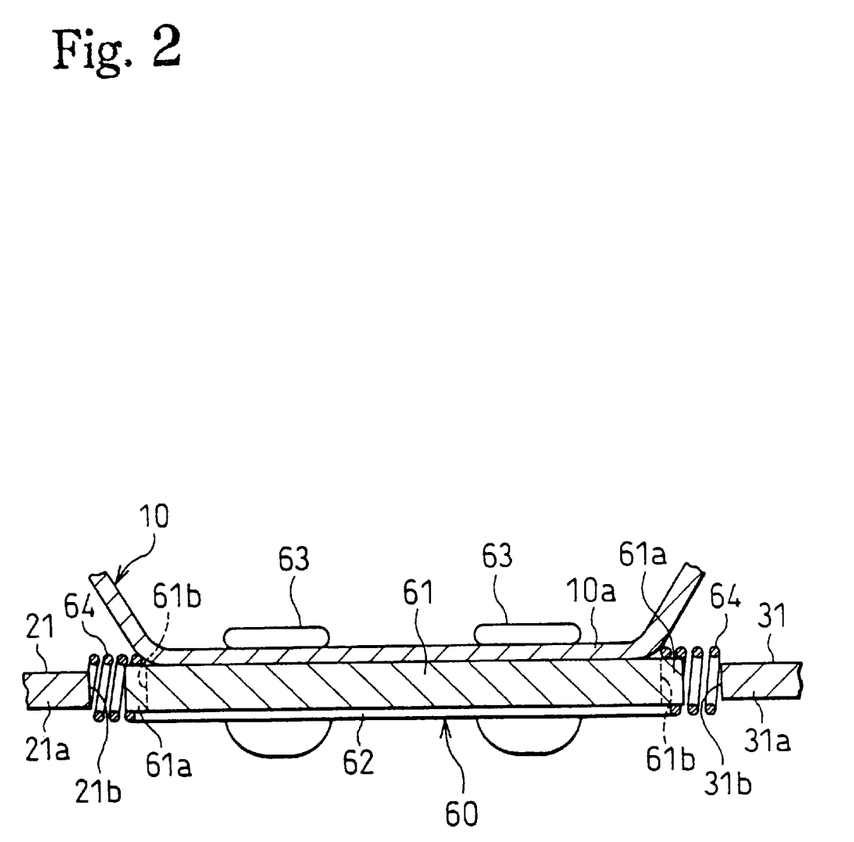
FIG. 2 is a cross-section view of FIG. 1 taken along the line II—II.
Figure 3:
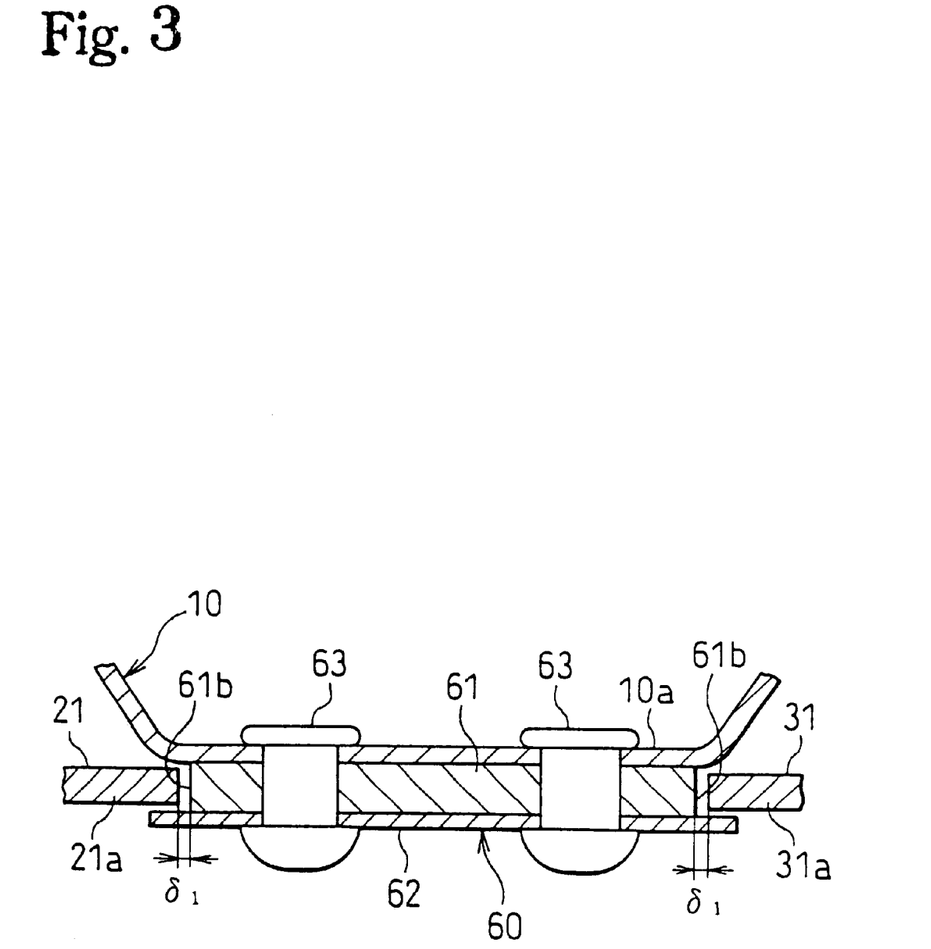
FIG. 3 is a cross-section view of FIG. 1 taken along the line III—III.

A conventional anchor device has one abutting point with each of the lower adjacent ends of the shoe webs 21, 31. On the other hand, this invention has two kinds of anchor members located at diametrical different positions, which alters the supporting points for each lower adjacent end 21a, 31a of the shoe webs 21, 31. This embodiment gives an example where a deformable anchor member is arranged closer to a brake center O of the drum brake and a rigid anchor member is arranged farther from the brake center O than the deformable anchor member. The following is a more detailed explanation of this embodiment.

A rectangular receiving plate 61 and a guiding plate 62 are superposed on a protrusion 10a of a back plate 10 and are fixed on the back plate 10 by means of rivets 63, 63, welding, or any other suitable fixing means or measure. Both ends of the guiding plate 62 overlap the shoe webs 21, 31 so as to prevent the lower adjacent ends 21a, 31a of the shoe webs 21, 31 from lifting upward.

<B> Deformable anchor Member

Projections 61a, 61a protrude on each side of the rectangular receiving plate 61 toward the shoe webs 21, 31 and are located closer to the brake center O than supporting surfaces 61b, 61b on each side of the receiving plate 61 as seen in the top view of FIG. 1. Abutment grooves 21b, 31b are formed at the lower ends of the shoe webs 21, 31 directly facing these projections 61a, 61a.

An elastic member 64, for example a coil spring having one side coiled over the projection 61a, is compressed between the bottom of the abutment groove 21b and one side surface of the receiving plate 61 (so as to be flush with the supporting surface 61b in this embodiment). In a corresponding inner another elastic member 64 (for example a coil spring, too) is also arranged between a bottom of the abutment groove 31b and the other side surface of the receiving plate 61 (so as to be flush with the other supporting surface 61b in this embodiment).

The spring force (spring constant/resiliency) of the elastic members 64, 64 is selected so that the resulting force is larger than that of the lower shoe return spring 12b such that slight clearances δ1, δ1 are present between the adjacent lower ends 21a, 31a of the shoe webs 21, 31 and the supporting surfaces 61b, 61b of the rectangular receiving plate 61, respectively.

Accordingly, each elastic member 64 functions as a deformable anchor member to resiliently or elastically support the adjacent lower ends 21a, 31a of the shoe webs 21, 31 of the brake shoes 20, 30 until a braking force reaches a predetermined value. On the other hand, when the braking force exceeds the predetermined value, each elastic member 64 no longer resiliently or elastically supports the lower ends 21a, 31a of the shoe web 21, 31 and thus changes the deformable anchor mechanism to a rigid anchor mechanism which rigidly supports the adjacent lower ends 21a, 31a of the shoe webs 21, 31 of the brake shoes 20, 30.

<C> Rigid Anchor Member

As is described above, prior to the braking force reaching the predetermined value, the adjacent lower ends 21a, 31a of the shoe webs 21, 31 are kept separated from the supporting surfaces 61b, 61b of the receiving plate 61 with clearances resulted by the interaction between the braking force and the spring force/resiliency of the elastic members 64, 64.

When the braking force exceeds the predetermined value, as the elastic members 64, 64 are compressed, the adjacent lower ends 21a, 31a of the shoe webs 21, 31 are abutted against the supporting surfaces 61b, 61b of the rectangular receiving plate 61 to be supported so as to function as a rigid anchor member.

The function of the brake shoe anchor device is explained next.

<A> No Braking Operation

Since the anchor device 60 is laterally mirror symmetrical as stated above and as shown in the Figures, the following sections only deal with the left half of the anchor device 60 and an explanation of the function of the right half of the anchor device supporting the brake shoe 30 is omitted.

Figure 4:
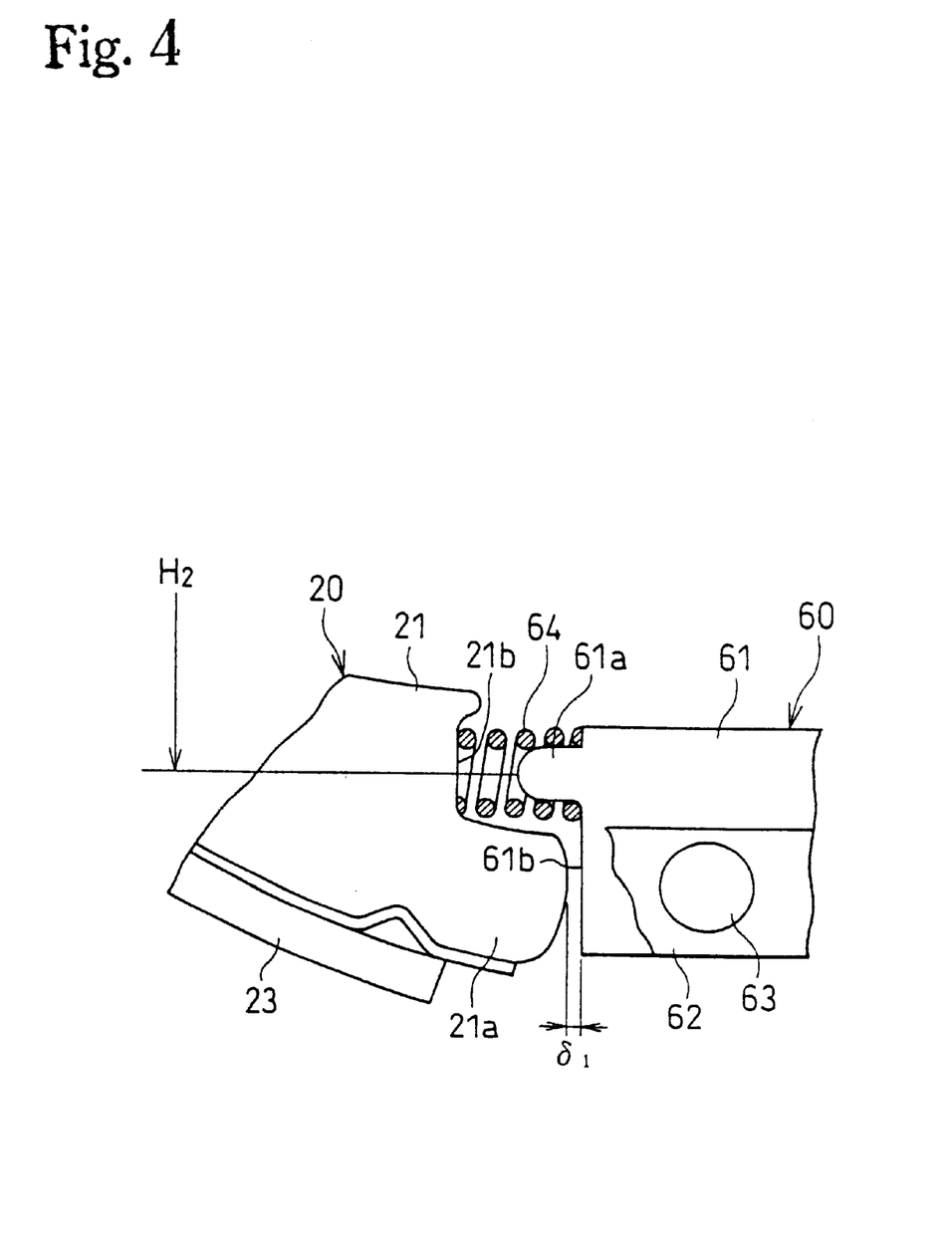
FIG. 4 is a plan view of the partially omitted brake shoe anchor device of FIG. 1 before the braking force reaches a predetermined value.

FIG. 4 shows the anchor device 60 before the braking force reaches the predetermined value, wherein the lower end 21a of the brake shoe 20 is supported by the deformable/ resilient anchor member comprising the elastic member 64 and there is a clearance δ1 between two facing surfaces thereof, i.e. between the lower end 21a of the brake shoe web 21 and the supporting surface 61b of the rectangular receiving plate 61.

<B> Braking Operation

When the hydraulic cylinder 40 is pressurized, it pushes the adjacent upper ends of the brake shoes 20, 30 outwardly, as described below, to spread the brake shoes open, thereby altering the supporting points of the lower ends of the shoe webs 21, 31 on the anchor device 60. Here, since the behavior of both brake shoes 20, 30 is almost identical, this section explains only that of the brake shoe 20 on the left half of the drum brake device.

That is, in FIG. 1, when a lining 23 of the brake shoe 20 frictionally engages with the inner circumferential surface of the brake drum (not shown in the figure) rotating in the direction of an arrow A, a compressive force is increasingly applied to the elastic member 64. As shown in FIG. 4, the elastic member 64 supports the lower end 21a of the shoe web 21 as the deformable anchor member while the brake shoe 20 opens with the abutting point with the elastic member 64 as the fulcrum and the lining 23 of the brake shoe 20 fictionally engages the inner circumferential surface of the brake drum (not shown in FIG. 1), thereby effecting the braking force.

Figure 5:
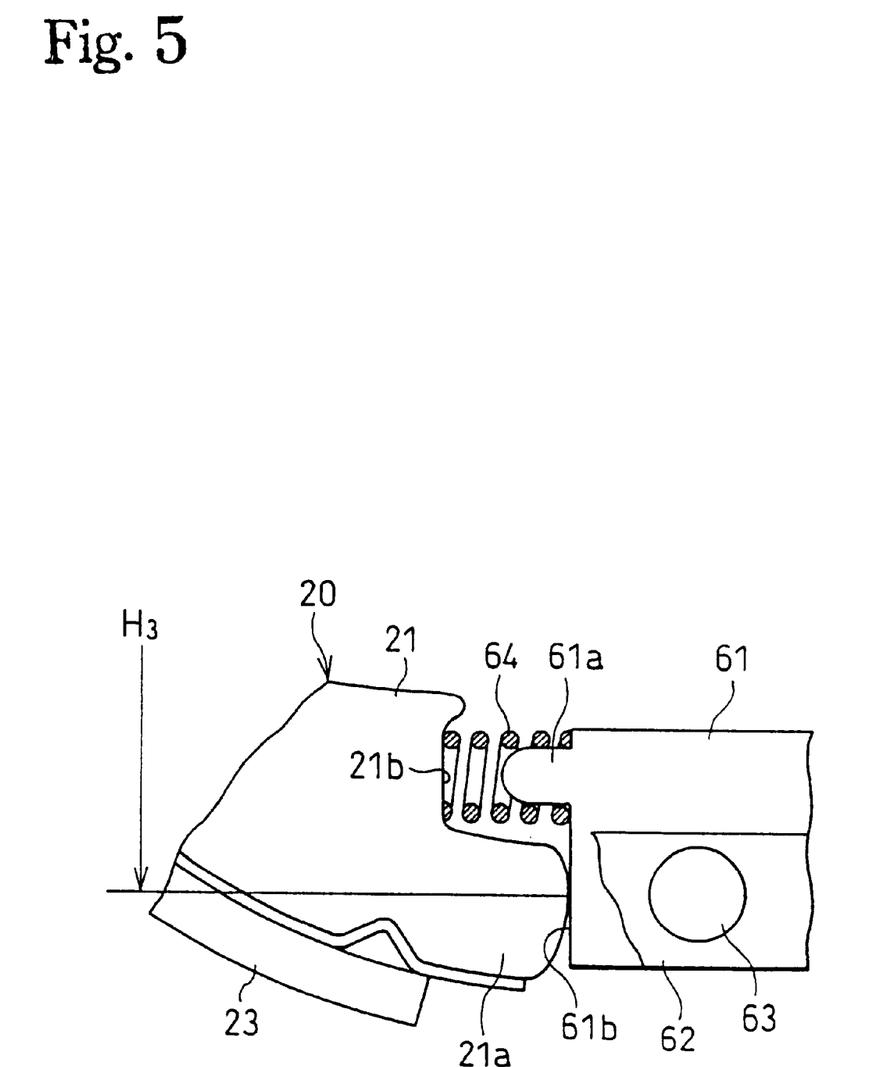
FIG. 5 is a plan view of the partially omitted brake shoe anchor device of FIG. 1 in a situation where the braking force exceeds the predetermined value.

When the braking force exceeds the predetermined value and a deformation of the elastic member 64 due to its compression results in clearing the clearance δ1, as shown in FIG. 5, an outer edge of the lower end 21a of the shoe web 21 abuts against the supporting surface 61b of the rectangular receiving plate 61 and is thus supported by the receiving plate 61 as the rigid anchor member at a supporting point which is radially located farther from the brake center O than the supporting point with the deformable anchor member.

Accordingly, the brake shoe 20 continues to open with the abutting point between the lower end 21a of the shoe web 21 and the supporting surface 61b of the rectangular receiving plate 61 as the fulcrum, thereby braking the brake drum rotation.

In addition, with respect to the above-described operation to support the lower end 21a of the brake shoe 20 by the rigid anchor member in one braking operation after it has been initially supported by the deformable anchor member, the same operation is applicable in a parking brake operation employing any commonly known parking brake mechanism.

<C> Comparison of a Braking Force

As is described above, at the early or initial stage of the braking operation, the lower end 21a of the shoe web 21 is supported at the deformable anchor member at the upper side of the rectangular receiving plate 61 (which is radially closer to the brake center O than the supporting point at the rigid anchor member) and is supported by the rigid anchor member at the lower side of the rectangular receiving plate 61 (which is radially farther from the brake center O than that at the deformable anchor member) when the braking force exceeds the predetermined value or magnitude.

That is, a distance H2 from a horizontal line passing through the brake center O and extending essentially orthogonal to a line being a symmetrical line for the pair of brake shoes to a position where an elastic resilient member 64, i.e. the deformable anchor member, supports the adjacent lower ends 21a, 31a of the shoe webs 21, 31 of the brake shoes 20, 30, is designed to be shorter than a distance H3 from this horizontal line passing through the brake center O to the supporting point between the adjacent lower ends 21a, 31a of the shoe webs 21, 31 of the brake shoes 20, 30 and the rigid anchor member of the rectangular receiving plate 61.

It is a well-known fact that the braking force achieved at the brake drum inner circumferential surface increases as the distance from the horizontal line passing through the brake center O to the anchor position where the brake shoes 20, 30 are supported becomes shorter. Therefore, at an early or initial stage of the braking operation, a larger braking force within a short period of time is attained by respectively supporting the adjacent lower ends 21a, 31a of the brake shoes 20, 30 by the elastic members 64, 64, i.e. by the deformable anchor member. This also eliminates the feeling of delay in braking effectiveness at the initial braking stage. Further, if the supporting points of the lower ends 21a, 31a of the brake shoes 20, 30 are changed from the deformable anchor member to the rigid anchor member, the drum brake device regains its usual braking effectiveness.

In addition, by selecting the distance H2 from the horizontal line passing through the brake center O to a point where the elastic member 64 is mounted on the rectangular receiving plate 61 in this manner, a larger braking force within a short period of time is achieved if designing to cause a phenomenon where the brake shoes 20, 30 stick to the brake drum, so-called self-lock effect (phenomenon).

Embodiment 2 of this invention is now explained below where the same reference numbers as labeled in the above Embodiment 1 are used for the same or similar parts and the explanation of the same is omitted.

Figure 6:
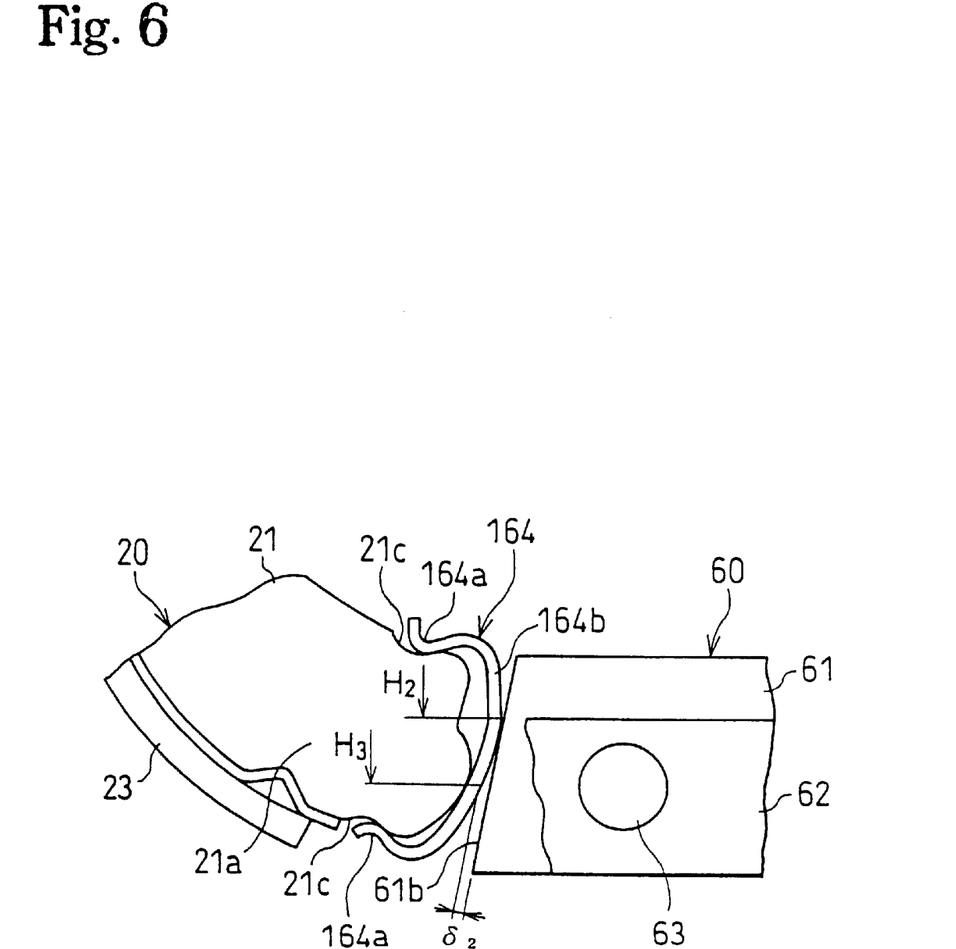
FIG. 6 is a plan view of a partially omitted brake shoe anchor device according to Embodiment 2 employing a plate spring as an elastic member.

FIG. 6 shows such other embodiment employing a plate spring as an elastic member 164 and an anchor member with inclined surfaces instead of an anchor with parallel surfaces as employed in Embodiment 1. While a right half of the anchor device 60 is not depicted in FIG. 6, a supporting structure of the brake shoe 30 is mirror symmetrical to the structure at the left half of the anchor device 60 supporting the brake shoe 20.

As stated above, a plate spring is employed as the elastic member 164. The plate spring is formed by bending a strip material into an approximately C-shape adapted to be clipped to a lower end portion 21a of the shoe web 21. Hooks 164a, 164a are formed at both ends of the elastic member 164 so as to elastically fit into shallow grooves 21c, 21c located on radially inner and outer circumferential edges of the shoe web 21. A top section of a spring portion 164b is arched between the hooks 164a and 164a and abuts against the abutment surface 61b of the receiving plate 61.

An approximately half portion of the edge surface of the lower end 21a of the shoe web 21 located closer to the brake center O is recessed to form a pocket for an upper end curve of the spring portion 164b of the elastic member 164 so as to allow the same to deform elastically at this section. This structure providing the supporting point between the elastically deformable spring portion and the rigid receiving plate 61 functions as the deformable or resilient anchor member where the spring portion 164b elastically abuts against but is supported by the plate 61 until the braking force reaches a predetermined value.

The other half portion of the edge surface of the lower end 21a of the shoe web 21 located radially farther from the brake center O abuts against the spring portion 164b of the elastic member 164, maintaining a clearance δ2 between the spring portion 164b and the supporting surface 61b of the receiving plate 61. The spring portion 164b of the elastic member 164 deforms until the braking force reaches the predetermined value. Then, when the braking force exceeds the predetermined value, the anchor device with the elastic member 164 interposed without further ability to deform elastically, rigidly supports the brake shoe 20 as the rigid anchor member.

In this Embodiment 2, as is described above, the brake shoe 20 is opened with a supporting point located at the deformable anchor member comprising the elastically deformable or resilient spring portion 164b of the elastic member 164 at the early or initial braking stage and with a supporting point at the rigid anchor member thereafter.

Figure 7:
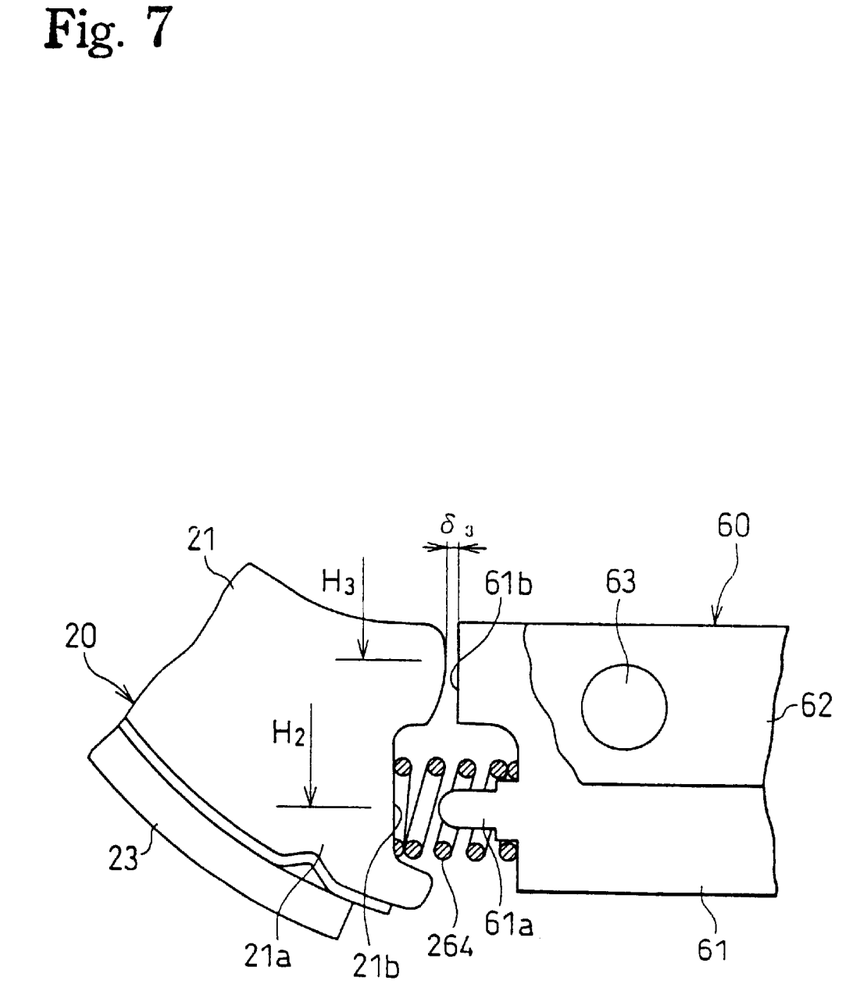
FIG. 7 is a plan view of a partially omitted brake shoe anchor device according to Embodiment 3 where a deformable anchor member and a rigid anchor member are arranged upside down contrary to the Embodiment 1.

FIG. 7 shows another embodiment of the invention which is a variation of Embodiments 1 and a where 2 deformable anchor member and a rigid anchor member are arranged upside down as compared to these previous embodiments.

As an anchor device 60 shown in FIG. 7, a deformable anchor member is formed with an elastic member 264 arranged between an edge surface of a lower end 21a of a shoe web 21 facing the anchor device at a radially farther from a brake center O and a supporting surface 61a of a receiving plate 61 while a rigid anchor member is formed with a clearance δ3 between the edge surface of the lower end 21a of the shoe web 21 at its radially closer to the brake center O and the supporting surface 61b of the receiving plate 61.

In this Embodiment 3, a distance H2 from a horizontal line passing through the brake center O, not shown in FIG. 7, to the supporting point between the lower end 21a of the shoe web 21 and the elastic member 264 as the deformable anchor member is longer than a distance H3 from the horizontal line to a supporting point between the lower end 21a of the shoe web 21 and the abutment surface 61b as the rigid anchor member. Accordingly, a braking force is lowered at the early or initial braking stage as compared to the previous embodiments. However, this Embodiment 3 has its advantage in preventing the over-braking phenomenon when frictional surfaces of linings and of a brake drum are wet, thereby eliminating the problem that a vehicle stops with jerks.

The above-described invention shall not be limited in application to the LT type drum brake device but it is applicable to the 2L type and a single shoe type internal shoe drum brake device which is configured with a hydraulic cylinder with a built-in single piston and a single brake shoe.

Further, a supporting surface of the anchor device in the invention has a broad range of applicability in that it may be utilized in a pivot anchor besides the above-described parallel or square slide anchor.

As is evident from what is described above, the invention has the following advantages:

<A> A braking force at the early or initial braking stage is altered simply by providing a resilient or deformable anchor member and a rigid anchor member and by changing a supporting point of the shoe webs from one to the other at different radial positions. The design of this structure can be appropriately chosen by determining the locations of these anchor members and by considering characteristics of a variety of linings and design dimensions for different types of vehicles, thereby facilitating the design of an optimum drum brake device in a vehicle braking system.

<B> Arranging the position of the rigid anchor member and of the rigid supporting point for the shoe webs to be radially farther from the brake center than that of the deformable anchor member and of the resilient supporting point provides an increase of the braking force at the early or initial braking stage, which eliminates a driver's impression of delay in braking effectiveness.

<C> Arranging the position of the deformable anchor member and of the resilient supporting point for the shoe webs to be radially farther from the brake center than that of the rigid anchor member and of the rigid supporting point for the shoe webs eliminates the problem that a vehicle stops with jerks due to overbraking induced by wetting on the surface of the frictional pairs.

<D> These applications have a broad range of applicability to a variety of types of drum brake devices without requiring substantial constructional changes.

It is readily apparent that the above-described has the advantage of wide commercial utility. It may be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A brake anchor device for supporting an end of a brake shoe in an internal drum brake device, wherein:

two anchor members are located at radial different positions with respect to a center of the brake device, one is a rigid anchor member having a rigid anchor surface for rigidly supporting said end of the brake shoe and the other is a deformable anchor member having a deformable anchor surface for resiliently supporting said end of the brake shoe device, and wherein said two anchor members are arranged such that the brake shoe is supported by said deformable anchor member maintaining a clearance between said rigid anchor member and said end of said brake shoe before a braking force reaches a predetermined value, and such that said brake shoe is supported by said rigid anchor member when the braking force exceeds the predetermined value.

2. A brake shoe anchor device as claimed in claim 1, wherein said deformable anchor member is positioned radially closer to a brake center than said rigid anchor member.

3. A brake shoe anchor device as claimed in claim 1, wherein said deformable anchor member is positioned radially farther from a brake center than said rigid anchor member.

4. A brake shoe anchor device as claimed in claims 1, wherein said deformable anchor member is comprised of an elastic material.

5. A brake shoe anchor device as claimed in claim 2, wherein said deformable anchor member is comprised of an elastic material.

6. A brake shoe anchor device as claimed in claim 3, wherein said deformable anchor member is comprised of an elastic material.

7. A brake shoe anchor device as claimed in claims 1, wherein said deformable anchor member comprises a coil spring.

8. A brake shoe anchor device as claimed in claims 2, wherein said deformable anchor member comprises a coil spring.

9. A brake shoe anchor device as claimed in claims 3, wherein said deformable anchor member comprises a coil spring.

10. The brake anchor device according to claim 1, said device further comprising:

a receiving plate, wherein said other anchor member is formed as a projection extending from said receiving plate and a coil spring mounted on said projection and disposed between said end of said brake shoe and said receiving plate, said coil spring being under compression biasing said brake shoe away from said receiving plate, and said rigid anchor member being a supporting surface formed on said receiving plate such that said supporting surface abuts said end of said brake shoe when said braking force exceeds said predetermined value.

11. The brake anchor device according to claim 10, wherein said coil spring is positioned radially closer to a brake center than said rigid anchor member.

12. The brake anchor device according to claim 10, wherein said coil spring is positioned radially farther from a brake center than said rigid anchor member.

13. A brake shoe anchor device in combination with and supporting an end of at least one brake shoe in an internal drum brake device responsive to a braking force, said anchor device comprising:
- a receiving plate including;
  - a first anchor surface; and
  - a second anchor surface;
- a deformable member disposed between said second anchor surface and said end of said brake shoe;
- wherein said first anchor surface and said second anchor surface are arranged such that said brake shoe is supported by said second anchor surface via said deformable member before said brake force reaches a predetermined value and said brake shoe is rigidly supported by said first anchor surface when said braking force exceeds said predetermined value.

14. The combination according to claim 10, wherein said deformable anchor surface comprises a projection extending from said receiving plate, and said deformable anchor member is a coil spring mounted on said projection and compressed between said receiving plate and said brake shoe end thereby biasing said brake shoe end away from said receiving plate.

15. The combination according to claim 13, wherein when said braking force is below said predetermined value there exists a clearance between said rigid anchor surface and said end of said at least one brake shoe and when said braking force exceeds a predetermined value, said deformable anchor member deforms and said rigid anchor surface moves to abut said end of said at least one brake shoe thereby eliminating said clearance.

16. The brake shoe anchor device according to claim 13, wherein said first anchor surface is positioned radially closer to a brake center than said second anchor surface.

17. The brake anchor device according to claim 10, wherein said first anchor surface is positioned radially farther from a brake center than said second anchor surface.

18. A brake shoe anchor device in combination with and supporting corresponding ends of a pair of brake shoes in an internal drum brake device responsive to a braking force, said combination comprising:
- a receiving plate disposed between said corresponding ends of said brake shoes, said receiving plate including;
  - a pair of first anchor surfaces; and
  - a pair of second anchor surfaces;
- a pair of deformable members one each disposed between said second anchor surfaces and said corresponding ends of said brake shoes; and
- a shoe return spring connecting said pair of brake shoes and biasing said corresponding ends thereof towards said receiving plate;
- wherein said first anchor surfaces and said second anchor surfaces are arranged such that said corresponding ends of said brake shoes are supported by said second anchor surfaces via said deformable members before said braking force reaches a predetermined value and said corresponding ends of said brake shoes are rigidly supported by said first anchor surfaces when said braking force exceeds said predetermined value.

19. The device according to claim 18, wherein when said braking force is below said predetermined value there exists a clearance between said pair of rigid anchor surfaces and said corresponding ends of said brake shoes and when said braking force exceeds a predetermined value, said deformable members deform and said rigid anchor surfaces move to abut a corresponding lower end of said brake shoes thereby eliminating said clearance.

* * * * *